(12) United States Patent
Endo

(10) Patent No.: US 7,113,072 B2
(45) Date of Patent: Sep. 26, 2006

(54) SEMICONDUCTOR DEVICE FOR KEYLESS ENTRY TRANSMITTER

(75) Inventor: Yoichi Endo, Chiba (JP)

(73) Assignee: Seiko Instruments Inc., (JP)

( * ) Notice: Subject to any disclaimer, the term of this patent is extended or adjusted under 35 U.S.C. 154(b) by 324 days.

(21) Appl. No.: 10/744,825

(22) Filed: Dec. 23, 2003

(65) Prior Publication Data

US 2004/0169582 A1 Sep. 2, 2004

(30) Foreign Application Priority Data

Dec. 24, 2002 (JP) ............................. 2002-371285

(51) Int. Cl.
*G06B 19/00* (2006.01)
*B60R 25/00* (2006.01)

(52) U.S. Cl. .................................. 340/5.26; 340/5.72
(58) Field of Classification Search ............... 340/5.26, 340/10.33

See application file for complete search history.

(56) References Cited

U.S. PATENT DOCUMENTS

| | | | | |
|---|---|---|---|---|
| 4,656,463 A | * | 4/1987 | Anders et al. ........... | 340/10.42 |
| 5,517,189 A | * | 5/1996 | Bachhuber et al. ........ | 340/5.72 |
| 5,838,257 A | * | 11/1998 | Lambropoulos ........... | 340/5.72 |
| 6,104,333 A | * | 8/2000 | Wood, Jr. ............... | 340/825.72 |
| 6,104,334 A | * | 8/2000 | Allport .................. | 340/825.72 |
| 6,292,107 B1 | * | 9/2001 | Yamaura et al. ............. | 340/5.7 |
| 6,664,899 B1 | * | 12/2003 | Tsuchihashi ........... | 340/825.69 |
| 2003/0034898 A1 | * | 2/2003 | Shamoon et al. ...... | 340/825.72 |

* cited by examiner

*Primary Examiner*—Brian Zimmerman
*Assistant Examiner*—Clara Yang
(74) *Attorney, Agent, or Firm*—Adams & Wilks

(57) ABSTRACT

A semiconductor device for a keyless entry transmitter has a command data circuit connected to communication terminals for communication with a microcomputer. A memory circuit is connected to the command data circuit for storing rolling code data. A timer period setting register is connected to the command data circuit for storing timer period setting data. A timer circuit is connected to the command data circuit, the timer period setting register and a clock terminal for outputting an enable signal for placing the microcomputer into an intermittent operation state upon receiving an output signal of the command data circuit, an output signal of the timer period setting register, and a clock signal of the clock terminal. A regulator output voltage setting register is connected to the command data circuit for outputting a signal in response to an output signal of the command data circuit. A regulator circuit is connected to the regulator output voltage setting register for outputting an output voltage upon receiving an input voltage and the output signal of the regulator output voltage setting register.

6 Claims, 5 Drawing Sheets

SEMICONDUCTOR DEVICE FOR KEYLESS ENTRY TRANSMITTER

BACKGROUND OF THE INVENTION

1. Field of the Invention

The present invention relates to a semiconductor device and more specifically to semiconductor devices in a transmitter system of a wireless door opening and closing system, each of which is composed of a timer circuit for controlling an operation time of the transmitter system, a regulator circuit for supplying power to a transmission circuit, and a memory for rolling codes.

2. Description of the Related Art

A transmitter of a wireless door opening and closing system, for example, a key system for opening and closing a door of an automobile, is battery driven and, in order to prolong the life of the battery, a built-in transmission circuit portion and a microcomputer have to operate on low current. A common method to reduce the power consumption of the transmission circuit portion and microcomputer is to lower the carrier wave frequency of radio while using a detector circuit to cause the microcomputer to operate intermittently (see JP 2000-17916 A (Pages 3 to 4, FIG. 1), for example).

Even when the carrier wave frequency of radio is lowered and a detector circuit is used to cause the microcomputer to operate intermittently as a measure to prolong battery life, the detector circuit portion consumes a large amount of current and thus presents an obstacle to exponential prolonging of battery life. In addition, lowering of the carrier wave frequency means a shorter reaching range, which makes steady transmission difficult.

SUMMARY OF THE INVENTION

The present invention has been made in view of the foregoing problems in the conventional art, and an object of the present invention is therefore to provide means that replaces the detector circuit portion for further reduction of current consumption while the radio reaching range is stabilized by optimizing power that is supplied to the transmission portion.

While the detector circuit portion that is necessary for an intermittent operation for a microcomputer is usually composed of a plurality of amplifiers and comparators, one timer circuit is used to put a microcomputer into an intermittent operation in accordance with a timetable that is obtained from time count of the timer circuit. This simplifies the circuit structure and reduces current consumption. In addition, the output voltage of a regulator for supplying voltage to a circuit of a transmission portion can be adjusted externally. This makes it possible to extend a short communication range by raising the output voltage of the regulator, thus achieving a stable communication.

According to the present invention, there is provided a semiconductor device including: a command data circuit for outputting signals in response to a CE signal, a clock signal, and a data signal of a microcomputer; a memory circuit having a memory for rolling codes to output stored data to a microcomputer through the command data circuit; a timer period setting register for outputting a signal that sets a period of intermittent operation of the microcomputer in response to an output signal of the command data circuit. Further, according to the present invention, there is provided the semiconductor device including: a timer circuit for outputting an enable signal, which puts the microcomputer into an intermittent operation, upon receiving an output signal of the command data circuit, the output signal of the timer period setting register, and a signal of a crystal oscillator; a regulator output voltage setting register for outputting a signal in response to an output signal of the command data circuit; and a regulator circuit for outputting an output voltage upon receiving an input voltage and the output of the regulator output voltage setting register.

DETAILED DESCRIPTION OF THE PREFERRED EMBODIMENT

A detailed description is given below with reference to the drawings on a preferred embodiment of a semiconductor device of the present invention.

Figure 1:
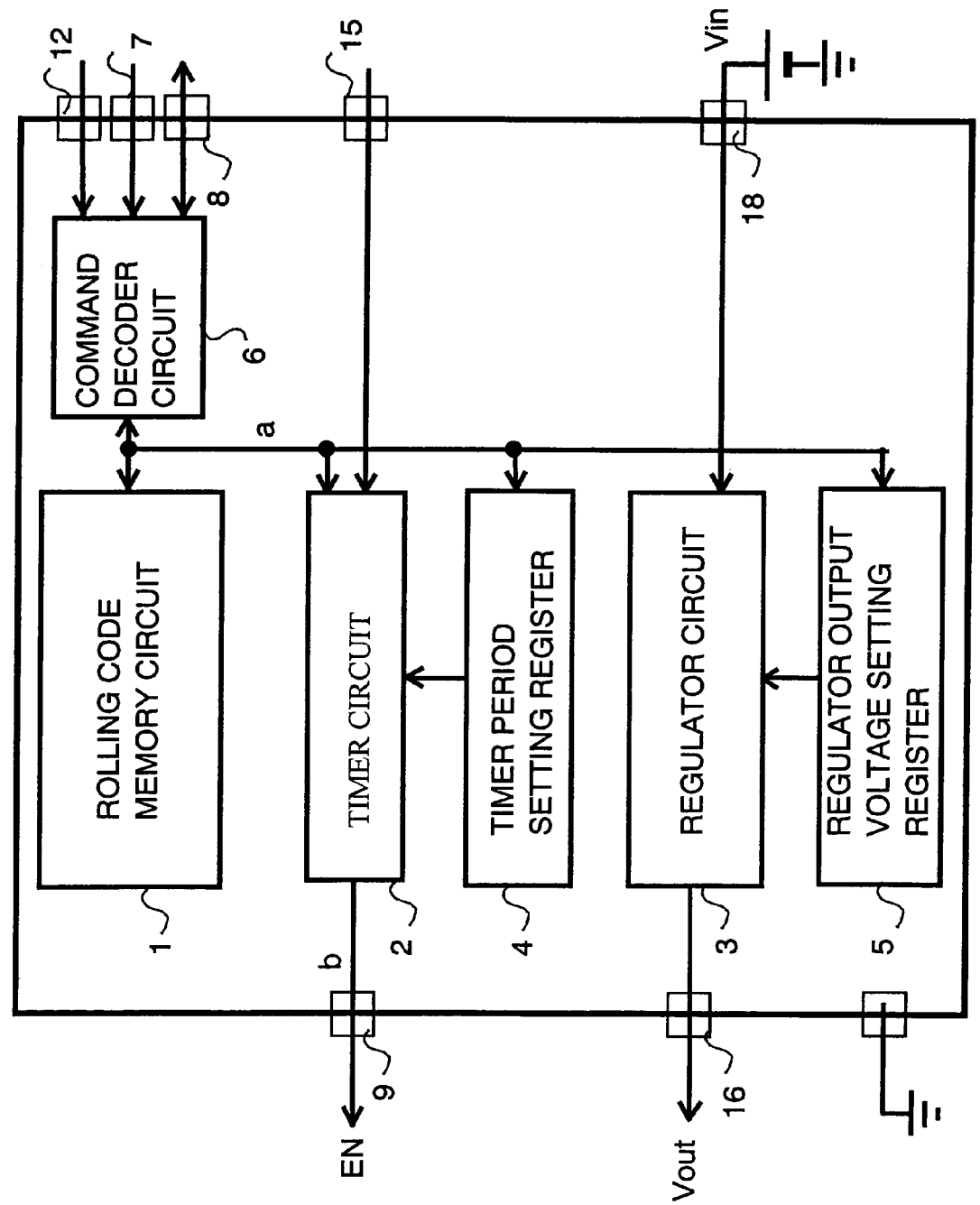
FIG. 1 is a structural diagram showing an embodiment of the present invention applied to a device.

FIG. 1 shows the structure of a semiconductor device in a transmitter of a wireless door opening and closing system. Specifically, shown in FIG. 1 is a structure for when the present invention is applied to a keyless entry system for automobiles.

The blocks of the semiconductor device, namely, a rolling code memory circuit 1, a timer circuit 2, a regulator circuit 3, a timer period setting register 4, and a regulator output voltage setting register 5, are connected to a decode output signal a of a command decoder circuit 6. The blocks share a clock terminal 7 and a data terminal 8 which are connected to the command decoder circuit 6. An enable signal b is outputted from the timer circuit through an enable terminal 9. The enable signal b is connected to the enable terminal 9 of a microcomputer, which operates intermittently in accordance with a change in state of the enable terminal 9 between an active state and an inactive state. To set the length of an intermittent operation period, the timer period setting register 4 has to be preset. Setting the timer period setting register 4 is achieved by storing timer period setting data through serial communication with the microcomputer via the clock terminal 7 and the data terminal 8.

Figure 2:
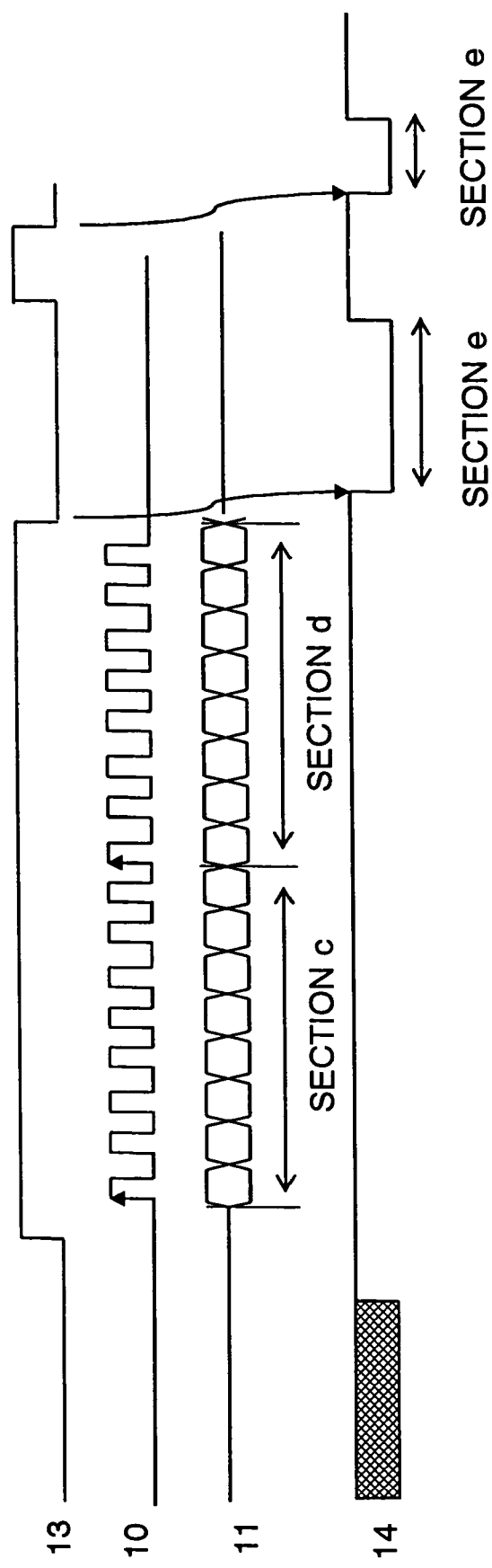
FIG. 2 is a timing chart showing how a timer circuit and a microcomputer communicate with each other in an embodiment of the present invention.

A method of the serial communication is shown in FIG. 2. The communication is made using a clock terminal signal 10 and a data terminal signal 11. Here, a timer instruction code 8-bit section c is sent for timer register setting and then a timer period setting data section d is transmitted, storing 8 bits of data in the timer period setting register 4. 8 bits of the timer period setting data section d are stored as binary data. In practice, however, two seconds are allotted to the timer period setting data section d corresponding to binary data if the data is FF, and one second if the data is 00. Although the timer period setting data section d here has 8 bits, the bit number may be increased or reduced depending on the time allotted. A set timer period section e is outputted through the enable terminal 9 during a period from the fall of a CE terminal signal 13, which is a signal inputted from a CE terminal 12, to a section e of an EN terminal signal 14.

The timer circuit 2 is composed of a counter circuit, and is put into operation by counting time using as the reference pulses that are inputted from an external crystal oscillation element through a 32 k clock terminal 15. Accordingly, the timer circuit 2 is simplified and the current consumption of the timer circuit 2 can be suppressed to 1 μA or lower. In this way, the system consumes less current than the type that uses a detector circuit to put a microcomputer into an intermittent operation, and battery life is accordingly prolonged.

The output terminal of the regulator circuit 3, a VOUT terminal 16, is a terminal for outputting an output voltage VOUT, which supplies voltage to an external transmission circuit. The output voltage VOUT can be varied by changing an input voltage VIN, which is inputted through a VIN terminal 18, in accordance with data stored in the regulator voltage setting register. Data to be stored in the regulator voltage setting register 5 can be set by serial communication with the microcomputer.

Figure 3:
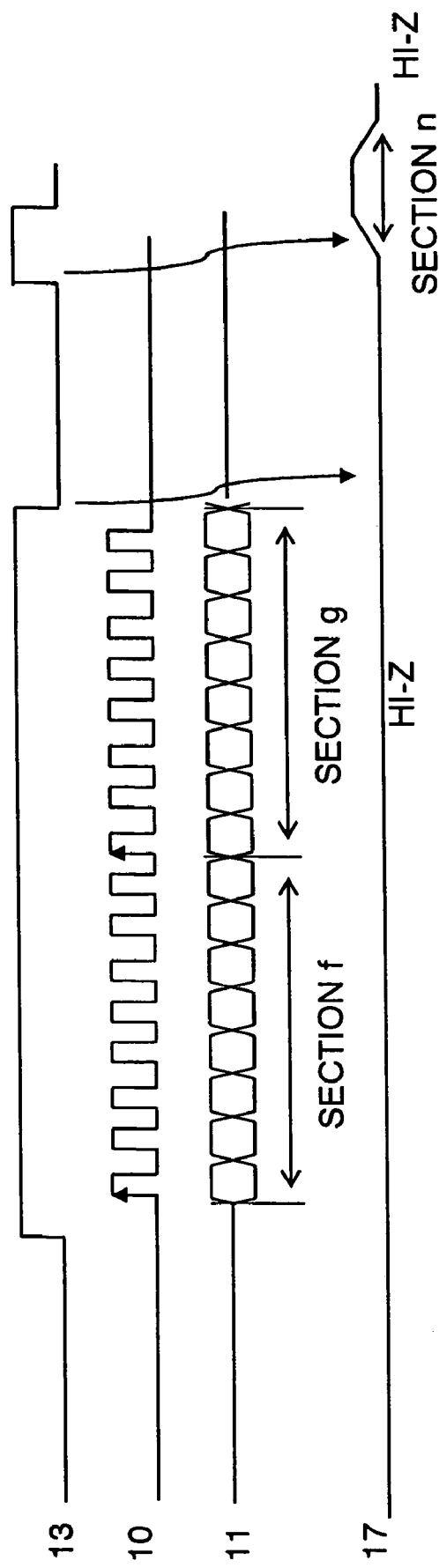
FIG. 3 is a timing chart showing how a regulator circuit and a microcomputer communicate with each other in an embodiment of the present invention.

A method of the serial communication is shown in FIG. 3. The communication is made using the clock terminal 7 and the data terminal 8. Here, a regulator instruction code 8-bit section f is sent for setting the regulator voltage setting register and then a regulator voltage setting data section g is transmitted, storing 8 bits of data in the regulator voltage setting register 5. 8 bits of the regulator voltage setting data section g are stored as binary data. In practice, however, 3.0 V is allotted to the regulator voltage corresponding to binary data if the data is FF, and 2.0 V if the data is 00. Although the regulator voltage setting data section g here has 8 bits, the bit number may be increased or reduced depending on the voltage allotted.

The output voltage VOUT according to 8 bits of the set regulator voltage setting data section g is outputted through the VOUT terminal 16 during a VOUT output section n of a VOUT terminal signal 17.

Figure 4:
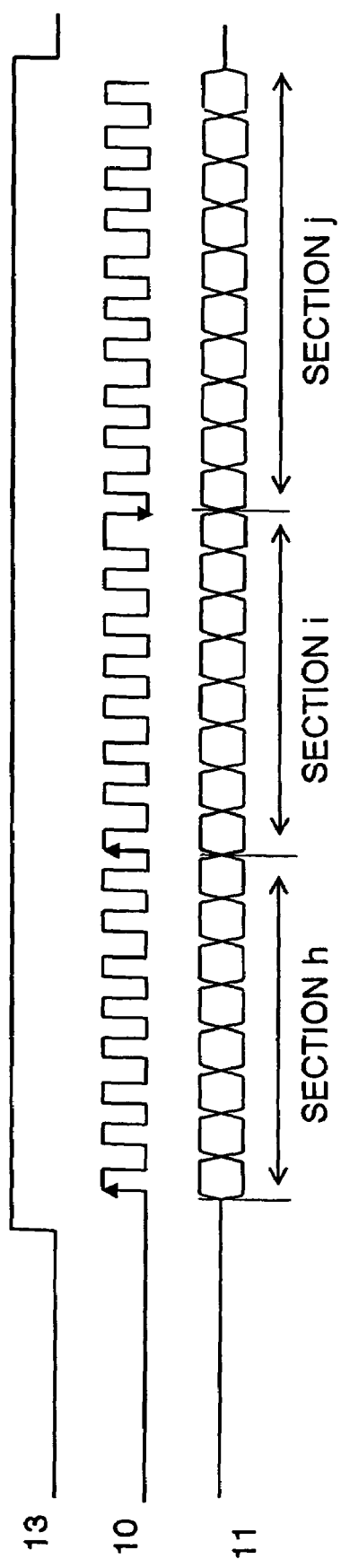
FIG. 4 is a timing chart showing a reading communication method that is employed between a rolling code memory circuit and a microcomputer in an embodiment of the present invention.
Figure 5:
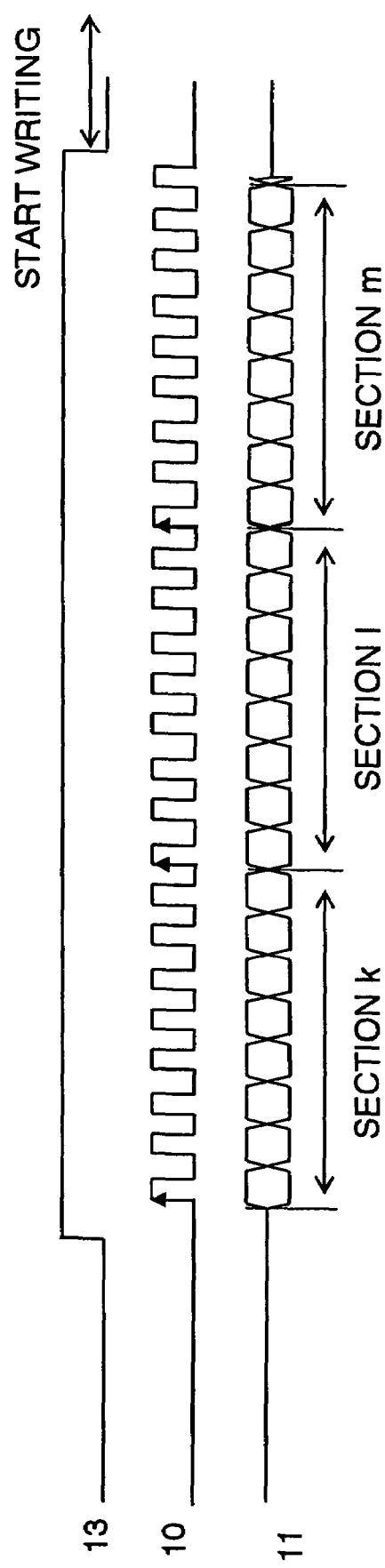
FIG. 5 is a timing chart showing a writing communication method that is employed between a rolling code memory circuit and a microcomputer in an embodiment of the present invention.

Similar to the timer period setting register and the regulator voltage setting register, the rolling code memory employs a serial communication. A method of the serial communication is shown in FIGS. 4 and 5. As shown in FIG. 4, to read data out of the rolling code memory 1, an EEPROM reading instruction code 8-bit section h is sent and then a reading address data section i is transmitted to output a reading data section j. The reading data section; is outputted through the data terminal 8. Although the reading address data section i here has 8 bits, the bit number may be increased or reduced depending on the capacity of the memory.

As shown in FIG. 5, to write data in the rolling code memory 1, an EEPROM writing instruction code 8-bit section k is sent and then a writing address data section l is transmitted to input a writing data section m and let the CE signal 13 fall.

According to the present invention, a timer circuit is used to put a microcomputer into an intermittent operation in accordance with a timetable that is obtained from time count of the timer circuit. This simplifies the circuit structure and reduces current consumption. In addition, the output voltage of a regulator for supplying voltage to a circuit of a transmission portion can be adjusted externally. This makes it possible to extend a short communication range by raising the output voltage of the regulator, thus achieving a stable communication. Effects of the reduced current consumption and adjustable output voltage are prolonged battery life and optimized radio reaching range.

According to the present invention, the timer circuit, the regulator circuit, and the rolling code memory may have a non-volatile memory in addition to a volatile memory in order to prevent data loss while supply of voltage is stopped, for example, when the battery is changed.

What is claimed is:

1. A semiconductor device for a keyless entry transmitter, the semiconductor device comprising:
    a command data circuit connected to communication terminals for communication with a microcomputer;
    a memory circuit connected to the command data circuit for storing rolling code data;
    a timer period setting register connected to the command data circuit for storing timer period setting data;
    a timer circuit connected to the command data circuit, the timer period setting register and a clock terminal for outputting an enable signal for placing the microcomputer into an intermittent operation state upon receiving an output signal of the command data circuit, an output signal of the timer period setting register, and a clock signal of the clock terminal;
    a regulator output voltage setting register connected to the command data circuit for outputting a signal in response to an output signal of the command data circuit; and
    a regulator circuit connected to the regulator output voltage setting register for outputting an output voltage upon receiving an input voltage and the output signal of the regulator output voltage setting register.

2. A semiconductor device for a keyless entry transmitter, the semiconductor device comprising:
    a timer circuit for controlling an operation time of a wireless transmission circuit;
    a regulator circuit for supplying power to the wireless transmission circuit, the regulator circuit having a memory, a data line and a clock line for communicating with the microcomputer, an output voltage of the regulator circuit being varied in accordance with data from the microcomputer;
    a memory circuit for storing rolling code data; and
    an enable terminal for outputting an enable signal for activating the microcomputer in accordance with a timetable controlled by the timer circuit, the enable signal being switchable between an active state and an inactive state to place the microcomputer in an intermittent operation state.

3. A semiconductor device for a keyless entry transmitter according to claim 2; wherein the timer circuit has a circuit communicating with the microcomputer for controlling the timetable to switch the enable signal of the timer circuit between an active state and an inactive state in response to data received from the microcomputer.

4. A semiconductor device for a keyless entry transmitter according to claim 3; wherein the timer circuit has a memory for storing data from the microcomputer.

5. A semiconductor device for a keyless entry transmitter according to claim 3; wherein the enable signal of the timer circuit alternates automatically between an active state and an inactive state.

6. A semiconductor device for a keyless entry transmitter according to claim 2; wherein the output voltage of the regulator circuit is varied in order to optimize a radio reaching range and power consumption of the wireless transmission circuit through adjustment of a level of a voltage supplied to the wireless transmission circuit.

* * * * *